United States Patent Office 3,225,185
Patented Dec. 21, 1965

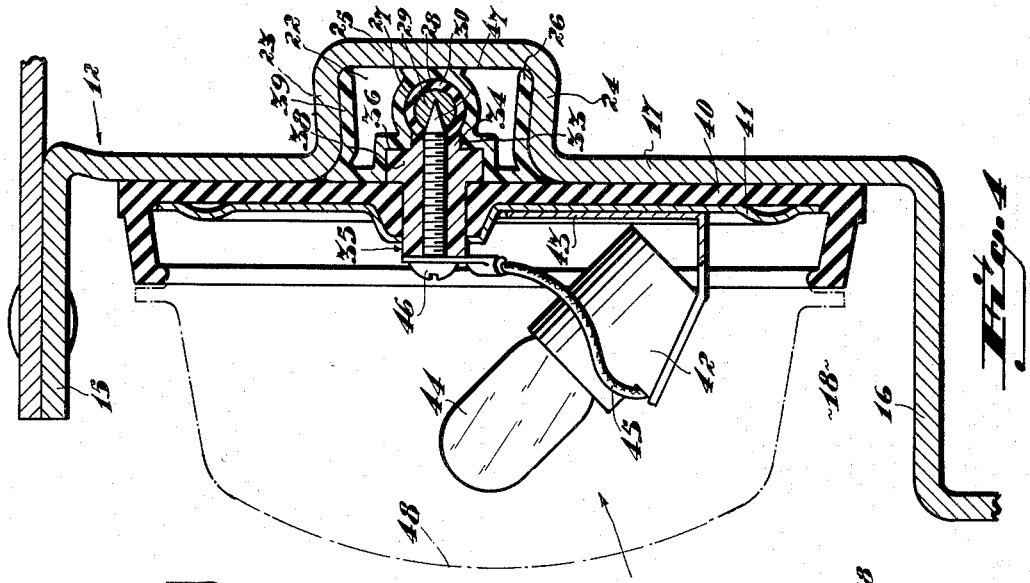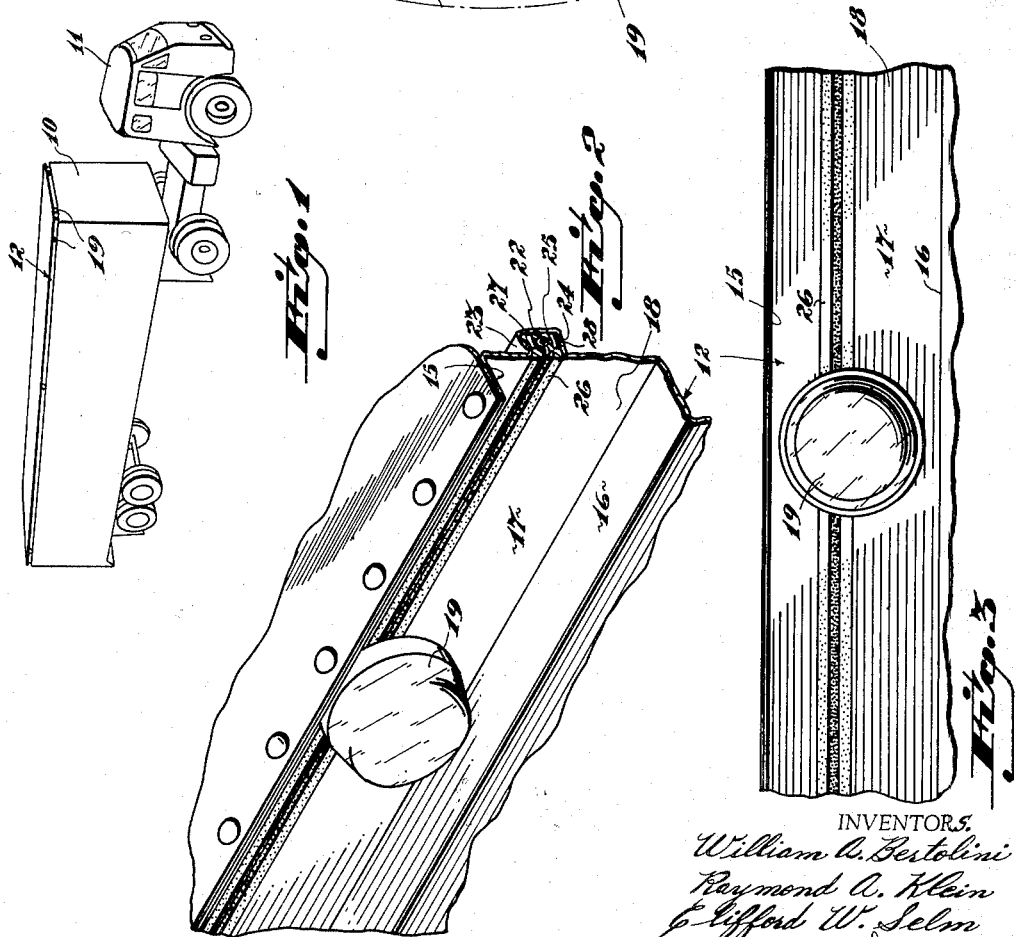

3,225,185
MOUNTING FOR MARKER LIGHT
William A. Bertolini, Raymond A. Klein, and Clifford W. Selm, Cincinnati, Ohio, assignors to Pullman Incorporated, Chicago, Ill., a corporation of Delaware
Filed Feb. 10, 1964, Ser. No. 343,599
1 Claim. (Cl. 240—8.2)

This invention relates to marker lights for the cargo containers of roadway vehicles and more particularly the invention relates to the means for mounting the marker lights on the cargo containers and forming an electrical connection of the marker light to the electrical system of the vehicle. The invention has particular application to marker lights of the type described in Patent No. 3,087,051, issued to James J. Black.

Prior to the invention of Black it was customary to extend the wiring for the marker lights around the inside of the cargo container. The outside marker lights were connected to the wiring through holes formed in the cargo container with leads passing from the marker lights through the holes to the inside wiring. The installation of marker lights in such containers was time consuming, expensive, and somewhat restrictive in the number and manner of distribution of the marker lights around the cargo container.

In accordance with the Black invention a cable to the marker lights is disposed around the outside of the container and the marker lights each have a contact formed as a sharp projection which is adapted to pierce the conductive cable to engage the center core of that cable thereby forming the electrical connection of the lamp to the current passing through the cable. The ground connection of the marker light is formed by the mounting of the marker light on the grounded metallic cargo container structure.

The nature of the pierced cable connection to the electrical system requires a certain amount of precision in the orientation of the marker light with respect to the conductive cable. Before the connection is made the orientation must be such that when the marker light is properly positioned on the cargo container, the sharp projection must enter the cable as close to its center as possible so as to pass diametrically through the conductive core of the cable. To this end, and in accordance with the Black invention, the cable is disposed snugly in a groove formed in the cargo container structure so that the position of the cable is fixed. To provide even greater assurance of the formation of the best electrical connection, a guide bushing is provided to guide the piercing projection exactly into the center of the cable.

The marker lights are installed principally in the quarter panel of the cargo container, that is the structural member which extends around the upper corner of the cargo container. The marker lights are, of course, installed on other portions of the container but reference is made particularly to the upper quarter panel since that is the structure on which the greatest number of marker lights is mounted. In the Black patent the marker light has been shown and described in relation to an extruded aluminum quarter panel. In being extrudable the aluminum quarter panel can have a cross-section of almost any prescribed intricacy including a cable receiving groove which will receive and hold a cable in proper position to receive the piercing contact.

A considerable number of cargo container bodies, however are steel containers, the steel containers providing a low cost, very rugged structure. This structure requires a steel quarter panel which, because of the nature of the metal, cannot be readily extruded. The quarter panel is, therefore, formed of sheet steel which is rolled into the desired configuration. It is not economically feasible to roll into the steel quarter panel a groove having a small dimension to receive and retain the conductive cable as snugly as is possible with the extruded aluminum structure. It would not be satisfactory, however, to dispose the cable in a groove which did not fix its position with the precision required for the proper mounting of the marker light for the reasons set forth above.

The objective of the present invention has been to provide means for adapting the rolled steel quarter panel for use with the outside cable and piercing connection of marker light to cable.

It has been another objective of the invention to adapt the steel quarter panel for use with the outside cable and to adapt the structure for use with the guide bushing referred to above.

These objectives are attained in part through the provision of a plastic strip which is mounted on the rolled steel quarter panel. Preferably the plastic strip and quarter steel panel have a mating configuration which assures the secure retention of the plastic strip in the quarter panel. The plastic strip is provided with a longitudinally extending groove precisely dimensioned to receive and snugly retain the conductive cable. The plastic strip also has a shouldered portion leading into the cable receiving groove, the shouldered portion being adapted to receive and center a guide bushing through which the conductive projection passes, thereby providing the greatest assurance that the projection will pass into the center of the cable. These and other objectives of the invention will become more readily apparent from the following detailed description taken in conjunction with the accompanying drawings in which:

FIG. 1 is a diagrammatic view of a roadway vehicle with which the present invention is used, FIG. 2 is a fragmentary perspective view of a rolled steel quarter panel illustrating the present invention, FIG. 3 is an elevational view of the quarter panel, and FIG. 4 is a cross-sectional view through the quarter panel and a marker light mounted thereon.

Referring to FIG. 1 of the drawings, a highway vehicle is shown including a cargo container 10 connected as a semi-trailer to a tractor 11 in the usual manner. The cargo container includes a structural member 12 which extends around the upper corner of the cargo container and is referred to herein as the quarter panel. The invention will be described with particular reference to the mounting of a marker light in the quarter panel for this is the predominate location for marker lights. However, it should be well understood that the invention is equally applicable to other structural members of the trailer wherein comparable problems are found, the principal problem being the need for adapting rolled steel members to receive the piercing projection type marker light.

An enlarged fragmentary view of the quarter panel is shown in FIG. 2. The quarter panel has been rolled from sheet steel to the configuration shown. That configuration includes side walls 15 and 16 connected by a bottom wall 17, the side walls and the bottom walls forming a channel 18 to receive a marker light 19. An elongated recess 22 is formed in the bottom wall 17, the recess having side walls 23 and 24 connected by a bottom wall 25. The side walls 23 and 24 are inclined toward each other to provide an undercut or dovetail section.

An elongated plastic adapter strip 26 is inserted in the recess 22. The side walls of the adapter will be inclined toward each other when the adapter is in the recess 22 so that the plastic adapter mates with the configuration of the recess 22. When the adapter is inserted in the recess, the over-hanging side walls 23 and 24 prevent the accidental or inadvertent outward displacement of the adapter thereby maintaining the adapter in position in the recess.

The plastic adapter 26 has a groove 27 which receives a cable 28 having a conductive core 29 and an insulative outer sheath 30. The depth of the groove 27 is preferably greater than the diameter of the cable, thereby providing guide walls 33. The guide walls receive the projecting end 34 of a plastic guide bushing 35 forming a part of the base of the marker light. Similarly the adapter 26 has a shoulder 36 against which an annular flange 38 of the guide bushing bears. It should be understood that it is not absolutely necessary to use the guide bushing in this invention but the guide bushing has the advantage of providing assurance that the sharp contact projection guided by it will pass diametrically into the conductive cable. It is, therefore, a feature of the present invention that the adapter 26 is suitable for use with that guide bushing. The adapter 26 includes legs 39 which, when the adapter is extruded, are spread apart a distance greater than the width of the recess 22. The legs must be squeezed inwardly to fit the strip in the recess, and the resilience of the legs helps retain the strip in the recess.

The structure of the marker light 19 is not directly related to the present invention except that the present invention is especially adapted for assuring proper electrical contact with a conductive cable by a piercing projection forming a part of the marker light. In the illustrated form of the invention, the marker light has a rubber base 40 which is seated in the recess 18 of the quarter panel 12. The rubber base 40 contains a metallic base plate 41 on which a marker light socket 42 is mounted by means of a bracket 43. The plate 40 will be connected to the grounded quarter panel by means of the marker light mounting screws, not shown. The bracket 43 provides the electrical grounding of the socket 42 to the plate 41 and quarter panel 12. The socket 42 receives a light bulb 44 which is electrically connected to the core 29 of the conductive cable by means of a lead 45 between the socket 42 and a screw 46 which passes through the guide bushing 35. The screw 46 has a sharp end 47 which forms the piercing projection discussed above. A lens 48 shown in broken lines encloses the marker light.

In the operation of the invention, the quarter panel 12 is rolled to the configuration illustrated in the drawings and is secured around the upper corner of the cargo container in the usual manner during the manufacture of the cargo container. The plastic adapter 26 is snapped into position in the recess 22 and may extend all the way around the cargo container. The compressibility of the plastic coupled with the absence of a cable riding in the groove permits the insert to be snapped past the overhanging walls 23 and 24 which form the recess 22. Only the ends of the adapter need to be fastened to the quarter panel in order to prevent its longitudinal shifting. When in place, the adapter is substantially coextensive with the quarter panel. The cable 28 is snapped into position in the groove 27.

The plastic adapter 26 precisely locks the cable 28 with respect to the quarter panel without requiring the tooling which would be necessary in order to roll the quarter panel to the extent necessary to provide a recess 22 which is as small as the groove 27 is in the plastic adapter.

When the cable is disposed in the plastic adapter 26 it is in position to receive the sharp projection 47 to make the electrical contact with the marker light. Screw holes are formed in the quarter panel and the marker light is mounted on the quarter panel by means of the screw holes. The screw holes are so located with respect to the recess 22 that upon application of the marker light the flange 38 of guide bushing 35 is seated on the shoulder 36 with the bushing end 34 projecting between the guide walls 33 to bring the screw 46 with its projection 47 precisely into the center of the conductive cable.

What is claimed is:

In a cargo container for a highway vehicle, a marker light mounting comprising, an elongated metal section, said section having a longitudinally extending recessed portion coextensive with said section, said recessed portion including overhanging side walls, an elongated plastic strip disposed in said recessed portion and having inclined side walls mating with said recess side walls to provide a dovetail retention of said strip in said recessed portion, said plastic strip having a recessed portion having an elongated cable receiving groove coextensive therewith and having guide walls extending outwardly of the groove and defining an opening communicating with the groove, a cable disposed in said groove, a marker light mounted on said section and having a pointed contact piercing said cable, a guide bushing engaging with the side walls and receiving the contact therethrough to align the contact for bringing same into substantially complete piercing relation with the cable to insure proper electrical conductivity therebetween, and stop means in the recessed portion limiting movement of the bushing toward the groove.

References Cited by the Examiner

UNITED STATES PATENTS

| | | | |
|---|---|---|---|
| 3,087,051 | 4/1963 | Black | 240—7.1 |
| 3,130,921 | 4/1964 | Morgan | 240—8.2 |
| 3,143,301 | 8/1964 | Trautner et al. | 240—7.1 |

NORTON ANSHER, *Primary Examiner.*